No. 893,476.  
PATENTED JULY 14, 1908.  
H. C. GILE.  
GRAIN SHOCKER FOR HARVESTERS.  
APPLICATION FILED MAY 10, 1907.

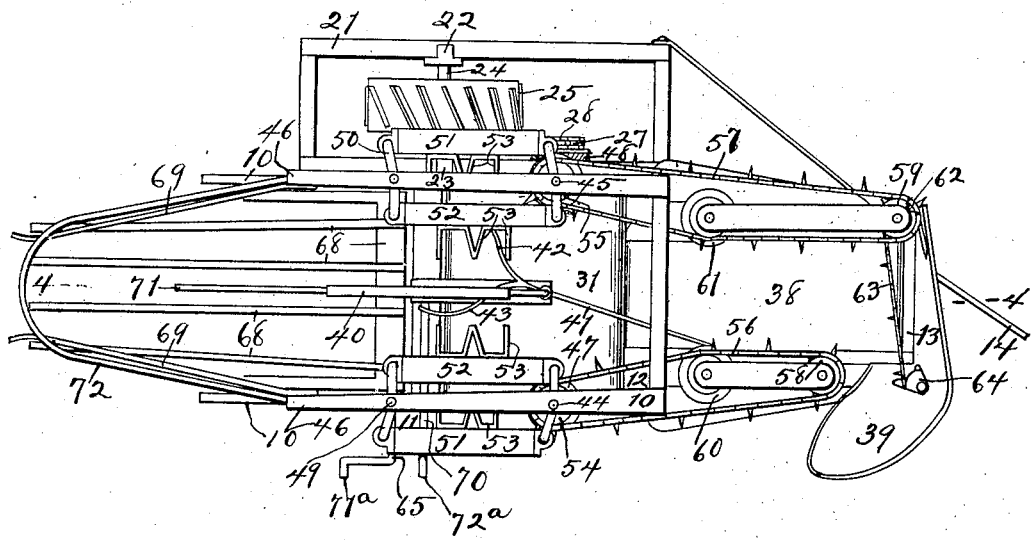

Fig. 3

Fig. 4

UNITED STATES PATENT OFFICE.

HIRAM C. GILE, OF OLDHAM, SOUTH DAKOTA.

GRAIN-SHOCKER FOR HARVESTERS.

No. 893,476.  Specification of Letters Patent.  Patented July 14, 1908.

Application filed May 10, 1907. Serial No. 373,867.

*To all whom it may concern:*

Be it known that I, HIRAM C. GILE, a citizen of the United States, residing at Oldham, in the county of Kingsbury and State of South Dakota, have invented a new and useful Grain-Shocker for Harvesters, of which the following is a specification.

The object of this invention is to provide improved means for receiving bundles of bound grain from a harvester, collecting said bundles, conveying said bundles in upright positions, and depositing said bundles in shocks or groups when desired.

A further object of my invention is to provide improved means for depositing in upright position an accumulated or collocated series of bundles of bound grain.

A further object of my invention is to provide improved means for attaching a grain shocking attachment and mechanism to a harvester.

A further object of my invention is to provide improved means for maintaining a plurality of bundles of bound grain in upright positions after they are received from a harvester and prior to their deposit collectively on the ground.

A further object of my invention is to provide means for adjusting the altitude or elevation of a grain shocking mechanism relative to the surface of the ground over which it travels.

My invention consists in the construction, arrangement and combination of elements hereinafter set forth, pointed out in my claims and illustrated by the accompanying drawing, in which—

Figure 1 is a plan of the complete grain shocking attachment. Fig. 2 is an elevation of one side of the same device. Fig. 3 is an elevation of the opposite side of the device. Fig. 4 is a longitudinal section of the device on the indicated line 4—4 of Fig. 1.

In the construction of the machine as shown, the numeral 10 designates a frame preferably made of channel bar and U-shaped in plan view, the closed end of the frame being at the front. A plurality of cross-bars 11, 12, 13 are mounted on and extend across the frame 10 and serve to connect the arms thereof and at times to support portions of the mechanism. Draft rod 14 connects the forward end portion of the frame 10 to the tongue of a harvester and, since said frame is located on the side of the harvester opposite to the sickle, it follows that the draft thereof will counter-balance the draft of the sickle and take the side draft of the machine off from the draft animals. A further connection is made between the frame 10 and the frame of the harvester by means of stirrups 15, 16 engaged with a bar 17 of the harvester frame and hooks 18, 19 on the frame 10 flexibly engaging in said stirrups. The hooks 18, 19 are mounted in a clip or connector 20 and the latter is adjustably mounted on the frame 10 at one side of its forward end portion. A housing frame 21 is fixed to the arm of the frame 10 opposite the harvester and bearings 22, 23 are mounted for vertical adjustment in said housing frame and arm. A shaft 24 is mounted for rotation in the bearings 22, 23 and a traction wheel 25 is mounted on said shaft between said bearings.

Through the medium of the adjustable bearings 22, 23 the elevation of the frame 10 and housing frame 21 may be determined and adjusted relative to the surface over which the machine travels through the support given by the traction wheel 25. A driving shaft 26 is mounted in bearings on and extends transversely of the frame 10 and a sprocket wheel 27 on said shaft is connected by a sprocket chain 28 to a sprocket wheel 29 on the traction wheel 25. Thus is the motion and power of the traction wheel 25 transmitted to the driving shaft and said shaft is rotated in the same direction as the traction wheel. A drum shaft 30 is mounted for rotation in bearings on the frame 10 at the rear of the driving shaft 26 and an apron or conveyer 31 is mounted on said drum shaft and extends around an idler drum shaft 32 extending transversely of the frame in front of the driving shaft. The apron or conveyer 31 also extends above and below the driving shaft 26. A drum shaft 33 is mounted transversely of the frame 10 in front of the idler drum shaft 32 and intermeshing gears 34, 35 connect the drive shaft 26 and drum shaft 33. Sprocket gearing 36 connects the drum shaft 33 to the drum shaft 30 to drive the conveyer or apron 31. An idler drum shaft 37 is mounted transversely of the forward end portion of the frame 10 and an apron or conveyer 38 connects said drum shaft to the drum shaft 33. A slide-way 39 is mounted on the forward end portion of the frame 10 in front and to one side of the forward portion of the conveyer or apron 38. The slide-way 39 may be placed on or used interchangeably relative to either side of the frame 10 and conveyer 38, dependent on the position of the frame relative to the harvester, said slide-way always being located on that side of the frame adjacent the harvester. A center board 40, in this instance of skeleton form, is mounted on and extends downward and forward from the cross-bar 11 immediately above the apron or conveyer 31. The upper portion of the center board 40 extends rearward a considerable distance beyond the cross-bar 11 and this center board preferably is of a length equal to the combined diameters of one-half the bundles to be carried on the shocker attachment. A deflector 41 is mounted pivotally on the forward end portion of the center board 40 and extends forward therefrom on the median line of the frame 10. Wings 42, 43 are formed on or fixed to and diverge from the end portion of the deflector 41, the purpose of which wings and deflector hereinafter will be made clear. Duplex crank shafts 44, 45 are mounted vertically in the frame 10 and on opposite sides of said frame from each other and the upper ends of said shafts are journaled in the upper frame 46 carried by the main frame. Bevel gearing 47, 48 connects the drive shaft 26 to the duplex crank shafts 44, 45. Idler crank shafts 49, 50 of a construction corresponding with that of the crank shafts 44, 45, are mounted for rotation in bearings in the main frame 10 and the upper frame 46 at the rear of the first crank shafts. Conveyer bars 51, 52, of identical construction and each formed with teeth, spikes or engaging arms 53 directed inward, are mounted on and connect the cranks of the vertical shafts. Two of the conveyer bars connect the cranks of the shaft 44 to those of the shaft 49 while another pair of said bars connect the cranks of the shafts 45 to those of the shaft 50. The cranks on a given shaft are opposite each other and correspond with the cranks of another shaft and, therefore, in the rotation of the main crank shafts, the bars 51, 52 are carried in elliptical orbits in such manner that at times they move rearward adjacent to the center board 40 and at other times they move forward at a distance from said center board, the movements of the respective shafts alternating. Sprocket wheels 54, 55 are mounted on the crank shafts 44, 45 and are connected by chains 56, 57 to idler sprocket wheels 58, 59 on vertical axes at the forward end of the frame 10. The sprocket chains 56, 57 run around and are guided and supported by flanged idlers 60, 61 also mounted on vertical axes in line with the sprocket wheels. A sprocket wheel 62 is fixed to the sprocket wheel 58 and is connected by a chain 63, extending across the forward end of the frame 10, to an idler sprocket 64 carried on the frame 10 or on the slide-way 39. A rock shaft 65 is mounted for oscillation in bearings fixed to the rear end portion of the frame 10 and said rock shaft extends across said frame at the rear of the cross-bar 11. Arms 66, (one of which is shown in Fig. 4) are fixed to and extend rearward from the rock shaft 65 within and between the arms of the frame 10.

A dumping apron 68, constructed as a fork having a plurality of tines with their rear ends separated and their front ends connected is mounted between the rear extremities of the arms of the frame 10. The dumping apron 68 is pivoted at its sides and intermediate of its ends on the rear ends of the arms 66, 67. Guard arms 69 are fixed to the upper frame 46 and extend rearward therefrom on opposite sides of and above the dumping apron. An oscillating latch, trigger or detent 70 is mounted on the cross-bar 11 and is adapted to engage at times the forward end portion of the dumping apron 68 and retain and support said apron elevated from the ground slightly. Crank arms 71ª and 72ª are formed on end portions of the rock shaft 65 and latch 70 respectively and lever and rod connections may be operatively secured to said cranks and extend within reach of the operator on the harvester in such a manner that when desired said operator can release the latch from the dumping apron 68 and thereafter can lift said dumping apron, through the medium of the rock shaft and its arms 66, 67, into engagement with said latch. The dumping apron also can be provided with a center board 71. A yoke 72 or keeper is fixed to and extends rearward from the upper frame 46 in longitudinal position above the dumping apron 68, and its function will hereinafter be made plain.

In the operation of the mechanism as described, the shocker attachment is drawn forwardly by reason of its connection to the tongue and frame of the harvester and in its forward movement causes the traction wheel 25 to rotate and transmit motion through the various shafts and gears described to the end of driving the aprons or conveyers 31 and 38 rearwardly in their upper portions and to drive the sprocket chains 56, 57 rearward in their inner portions, and to drive the sprocket chain 63 laterally away from the slide-way in its rear portion and to drive the conveyer bars as described and in the direction of the arrows in Fig. 1. The sprocket chains 56, 57 and 63 are provided with teeth or lugs extending laterally therefrom. Bundles of grain are dropped from the apron of the knotting mechanism into the slide-way 39 and descend, butt end first, upon the apron or conveyer 38. The bundle of bound grain is carried rearward by the conveyer 38 to and upon the conveyer or apron 31 and is carried further rearward by the latter apron. In its rearward movement on the respective conveyers or aprons the bundle is maintained in an upright position and also is forced rearward by the chains 56, 57 and the conveyer bars 51, 52. The bundle is given an initial direction away from the slide-way 39 by engagement with the chain 63. The first bundle of bound grain passes to one side or the other of the deflector 41 and engages the adjacent wing of said deflector and moves the deflector laterally across the path just traversed by the bundle, thereby positioning the deflector so that it will engage the next succeeding bundle of grain and cause it to take a course on the opposite side of the center board 40 from the first bundle. Succeeding bundles of grain to the desired number are received in sequence from the knotting mechanism and are carried, fed, forced and crowded rearward alternately on opposite sides of the center board 40 and into parallel rows on the dumping apron 68, the bundles being retained in vertical position in said parallel rows on the dumping apron by the lateral support afforded by the guard arms 69 and the center board 71 when the latter center board is employed.

When the desired number of bundles, ordinarily six or eight according to size, are accumulated on the dumping apron 68, said apron is dumped by the operator through oscillation of the rock shaft 65, which, as above mentioned, releases the dumping apron from the latch, trigger or detent 70, whereupon the dumping apron falls to the ground with its load and then slides forward from beneath the bundles of grain. While the dumping apron is in normal carrying position the upper ends of the bundles of grain thereon are engaged by the yoke or keeper 72 and prevented from falling rearward off of the apron; but when said apron is dropped into discharging position, the bundles pass freely beneath said yoke or keeper. Furthermore, the lateral pressure of bundles of grain tend to diverge the guard arms 69 rearwardly, with the result that when the apron 68 is dropped into discharging position and the butt ends of the bundles come in contact with the stubble, the forked apron can be withdrawn readily and the guard arms will release readily from the bundles and leave said bundles standing in the field in upright position and closely collocated as is desirable in shocking bound grain.

It is to be understood that other forms of conveying mechanism may be employed for carrying the bundles rearward in sequence and arranging them for collective discharge or dumping at the rear of the machine without departing from the spirit of my invention. Neither do I desire to be limited to the precise construction of the dumping apron as other means may be employed to carry and discharge the collocated group of bundles accumulated on the machine.

I claim as my invention—

1. A shocking attachment for harvesters, comprising front and rear conveyers adapted to carry bundles of grain, means for maintaining said bundles in upright position, feeding means for crowding said bundles rearwardly, a center board extending over the median line of the rearmost conveyer between the feeding means, a rock shaft, a dumping apron carried by said rock shaft and adapted to receive said bundles in upright positions from the conveyers, and a latch engaging said dumping apron.

2. A shocking attachment for harvesters, comprising front and rear conveyers adapted to carry bundles of grain, means for maintaining said bundles in upright position, feeding means for crowding said bundles rearwardly, a center board extending over the median line of the rearmost conveyer between the feeding means, a dumping apron mounted for oscillation at the rear of the rearmost conveyer and adapted to receive said bundles of grain and means for actuating said dumping apron to dump said bundles.

3. A shocking attachment for harvesters, comprising front and rear conveyers adapted to carry bundles of grain, a slideway adapted to feed bundles of grain to said conveyers, chains mounted for travel above and on opposite sides of one of said conveyers, feeding devices for crowding said bundles of grain rearwardly, a center board between said feeding devices, a rock-shaft at the rear of the rearmost conveyer, an apron carried by said rock-shaft and adapted to receive said bundles in upright positions from the rearmost conveyer, and means for dumping said apron.

4. A shocking attachment for harvesters, comprising front and rear conveyers adapted to carry bundles of grain, a slideway communicating with the foremost conveyer, chains on opposite sides of and above the foremost conveyer and adapted to maintain the bundles thereon in upright positions, a center-board extending over the median line of the rearmost conveyer, a deflector pivoted on the forward portion of said center-board, a rock-shaft at the rear of the rearmost conveyer, a dumping apron carried by said rock-shaft and means for sustaining and dumping said apron.

5. In a shocking attachment for harvesters, a horizontal conveyer, a center-board mounted above and extending on the median line of said conveyer, a deflector pivoted on the forward portion of said center-board, wings on the rear end of said deflector and extending in opposite directions laterally of said center-board and a dumping apron at the rear of said conveyer.

6. In a shocking attachment for harvesters, horizontal conveyers, a center board and feeding devices on opposite sides of the center board for maintaining bundles in upright positions on said conveyers, a dumping apron at the rear of said conveyers and a yoke above said dumping apron and adapted to be engaged by the upper portions of bundles on said apron.

7. In a shocking attachment for harvesters, conveyers adapted to carry bundles of grain, chains adapted to engage bundles of grain on one of said conveyers, feeders mounted for elliptical travel and adapted to engage bundles of grain on the other conveyer, a center-board mounted intermediate of said feeders and above one of said conveyers and a dumping apron at the rear of said conveyer and adapted to receive bundles of grain from said feeders.

8. In a shocking attachment for harvesters, conveyers adapted to carry bundles of grain, means for maintaining said bundles in upright position, means for crowding said bundles rearwardly, means for directing said bundles alternately to opposite sides of the center of the machine, a dumping apron mounted at the rear of said conveyers, a yoke mounted above said dumping apron and means for dumping said apron.

HIRAM C. GILE.

Witnesses:
R. L. THORLTON,
THOMAS G. ORWIG.